(12) United States Patent
Venkataramani (10) Patent No.: US 8,555,362 B2
(45) Date of Patent: Oct. 8, 2013

(54) LIGHTWEIGHT DIRECTORY ACCESS PROTOCOL (LDAP) PROXY

(75) Inventor: Srinath Venkataramani, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 13/187,307

(22) Filed: Jul. 20, 2011

(65) Prior Publication Data

US 2013/0024925 A1    Jan. 24, 2013

(51) Int. Cl.
*G06F 15/16* (2006.01)
*G06F 17/00* (2006.01)
*G06F 11/00* (2006.01)
*G06F 21/00* (2006.01)

(52) U.S. Cl.
USPC .............. 726/7; 726/1; 726/6; 726/9; 726/24; 713/185; 709/229

(58) Field of Classification Search
USPC ......... 380/255–256, 270–274; 713/150–154, 713/160–163, 168–174, 182–186, 202; 726/2–8, 11–15; 709/225, 229, 246–247, 709/249
See application file for complete search history.

(56) References Cited

U.S. PATENT DOCUMENTS 7,647,622 B1 * 1/2010 Sobel et al. ................. 726/1
2009/0328167 A1 * 12/2009 O'Mahony ................. 726/6

* cited by examiner

*Primary Examiner* — Evans Desrosiers
(74) *Attorney, Agent, or Firm* — Lowenstein Sandler LLP (57) ABSTRACT

Two factor LDAP authentication systems and methods are presented. In one embodiment, implementation of a method for authenticating a user through a two factor process includes: at an LDAP proxy server, receiving a BIND request from a client, wherein the BIND request is for authenticating a user associated with a username to an LDAP server, and wherein the BIND request comprises a password comprising a first factor security code and a second factor security code; stripping the second factor security code from the password; reconfiguring the BIND request with the password that is stripped of the second factor security code; forwarding the reconfigured BIND request to the LDAP server for authentication of the username using the first factor security code; performing authentication of the second factor security code; and positively authenticating the username to the LDAP server when the first factor security code and the second factor security code are authenticated in connection with the username.

20 Claims, 8 Drawing Sheets

LIGHTWEIGHT DIRECTORY ACCESS PROTOCOL (LDAP) PROXY

BACKGROUND

The Lightweight Directory Access Protocol (LDAP) is an internet standard that provides for communication with an LDAP information directory. It runs directly over the transmission control protocol/internet protocol (TCP/IP) and is used to access a standalone directory or a directory service in compliance with the X.500 Directory Access Protocol (DAP) standard. Because of its standardization, the LDAP directory can be accessed across many different platforms as long as the LDAP protocol is used for communicating with the server hosting the LDAP directory.

In some implementations, these LDAP directories are configured to support heavy read accesses. For instance, LDAP directories are well suited for storing information relating to the following: contact information of employees within a company, an employee organizational chart; personal information for employees within a company; business contact information for a company, and any other information relating to individuals and organizations.

LDAP is based on a client-server model, wherein the LDAP protocol defines operations used to search and update information within the LDAP directory. For example, a client may access the LDAP directory to perform, in part, searching, creating, updating, deleting, and renaming operations.

Access to the LDAP directory is through an established connection between the client and the LDAP directory. Before any connection is made, LDAP provides for an authentication mechanism used for controlling access to the LDAP directory. During the authentication process, the client submits a distinguished name and password so that the LDAP server can determine if that client has the proper permissions for accessing the LDAP directory. If the user associated with the distinguished name does not have the proper permissions, then access to the LDAP directory is denied, and the LDAP server will not execute the requested operation. On the other hand, if the user does have the proper permissions, then the user is granted access to the LDAP directory, and the operation is executed.

The authentication process provided under LDAP is some cases may not be sufficient to protect client information. In those cases, a strong authentication method for authentication may be necessary to further control access to the LDAP directory. For instance, strong authentication may encompass a two factor or multi-factor authentication, wherein two or more security categories or methods are used to authenticate the user.

However, LDAP does not immediately support strong authentication beyond secure socket layer (SSL) which can be used preliminarily to secure communications before and during the authentication process. That is, LDAP and the LDAP server are typically configured to provide single factor authentication in which the username is matched with a static password. This is unsatisfactory in many situations where additional security over information is needed before access to information is granted.

SUMMARY

Systems and methods of authenticating a user to an LDAP directory using an LDAP proxy are presented. In one embodiment, computer implementation of a method for authentication includes: at an LDAP proxy server, receiving a BIND request from a client, wherein the BIND request is for authenticating a user associated with a username to an LDAP server, and wherein the BIND request comprises a password comprising a first factor security code and a second factor security code; stripping the second factor security code from the password; reconfiguring the BIND request with the password that is stripped of the second factor security code; forwarding the reconfigured BIND request to the LDAP server for authentication of the username using the first factor security code; performing authentication of the second factor security code; and positively authenticating the username to the LDAP server when the first factor security code and the second factor security code are authenticated in connection with the username. In particular, the client device is configured to direct LDAP calls, such as BIND requests for authentication, to the LDAP proxy instead of directly to the LDAP server supporting the LDAP directory.

For instance, in some embodiments, a one-time password is stripped as the second factor security code from the password in the computer-implemented method. Authentication of the user is verified when the first factor security code and the second factor security code both are validated in connection with the username. After proper authentication, the user associated with the username is provided access to the LDAP server. On the other hand, the user associated with the username is not authenticated when either of the first factor security code or the second factor security code is not authenticated in connection with the username. Thereafter, after authorization, non-BIND calls associated with the username are forwarded to the LDAP server. Furthermore, responses to non-BIND calls coming from the LDAP server are forwarded to the client devices making the calls.

In some embodiments, a system includes a tangible, non-transitory computer-readable storage medium having stored thereon, computer-executable instructions that, when executed causes the computer system to perform a method for authentication, comprising: receiving a BIND request from an identity manager, wherein the BIND request is for authenticating a user associated with a username to an LDAP server, and wherein the BIND request comprises a password comprising a first factor security code and a second factor security code; stripping the second factor security code from the password; reconfiguring the BIND request with the password that is stripped of the second factor security code; forwarding the reconfigured BIND request to the LDAP server for authentication of the username using the first factor security code; performing authentication of the second factor security code; and positively authenticating the username to the LDAP server when the first factor security code and the second factor security code are authenticated in connection with the username.

In particular, the identity manager provides a third party service for authenticating to the LDAP server. As such, the system provides another layer between the LDAP server and the identity manager controlling access to the LDAP directory. For instance, the computer implemented method as executed by the system strips a one-time password as the security code from the password field. In that manner, the first factor and the second factor security codes are separated. Authentication of the user is verified when the first factor security code (e.g., username and reusable password) and the second factor security code (e.g., one-time password) both are validated in connection with the username. After proper authentication, the user associated with the username is provided access to the LDAP server. On the other hand, the user associated with the username is not authenticated when either of the first factor security code or the second factor security code is not authenticated in connection with the username.

Thereafter, after successful authentication non-BIND calls associated with the username are forwarded to the LDAP server. Furthermore, responses to non-BIND calls coming from the LDAP server are forwarded to the client devices making the calls.

In one embodiment, a computer system comprises a processor coupled to memory having stored therein instructions that, if executed by the computer system, cause the computer to execute a method for authentication, comprising: at an LDAP proxy server, receiving a BIND request from a client, wherein the BIND request is for authenticating a user associated with a username to an LDAP server, and wherein the BIND request comprises a password comprising a first factor security code and a second factor security code; stripping the second factor security code from the password; reconfiguring the BIND request with the password that is stripped of the second factor security code; forwarding the reconfigured BIND request to the LDAP server for authentication of the username using the first factor security code; performing authentication of the second factor security code; and positively authenticating the username to the LDAP server when the first factor security code and the second factor security code are authenticated in connection with the username.

Thus, according to embodiments of the present disclosure, authorization of a user is performed through implementation of a strong authentication proxy server that is able to parse a password field and separate out first factor and second factor security codes for purposes of performing authentication. As such, methods and systems for two factor LDAP authentication are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "identifying," "stripping," "reconfiguring," "forwarding," "performing," or the like, refer to actions and processes (e.g., flowchart 7 of FIG. 7) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
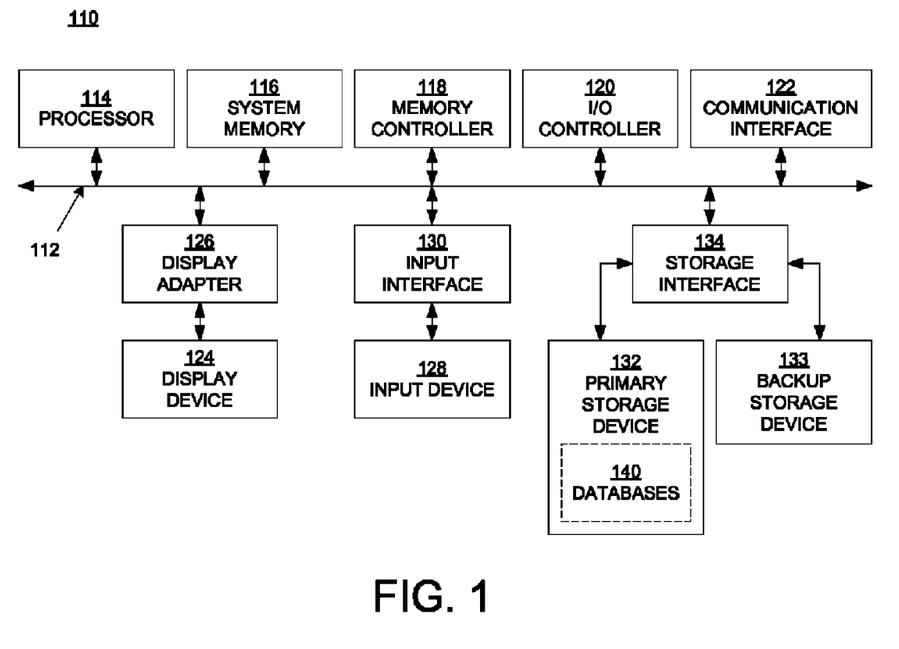
FIG. 1 depicts a block diagram of an exemplary computer system suitable for implementing the present methods in accordance with one embodiment of the present disclosure.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing.

For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
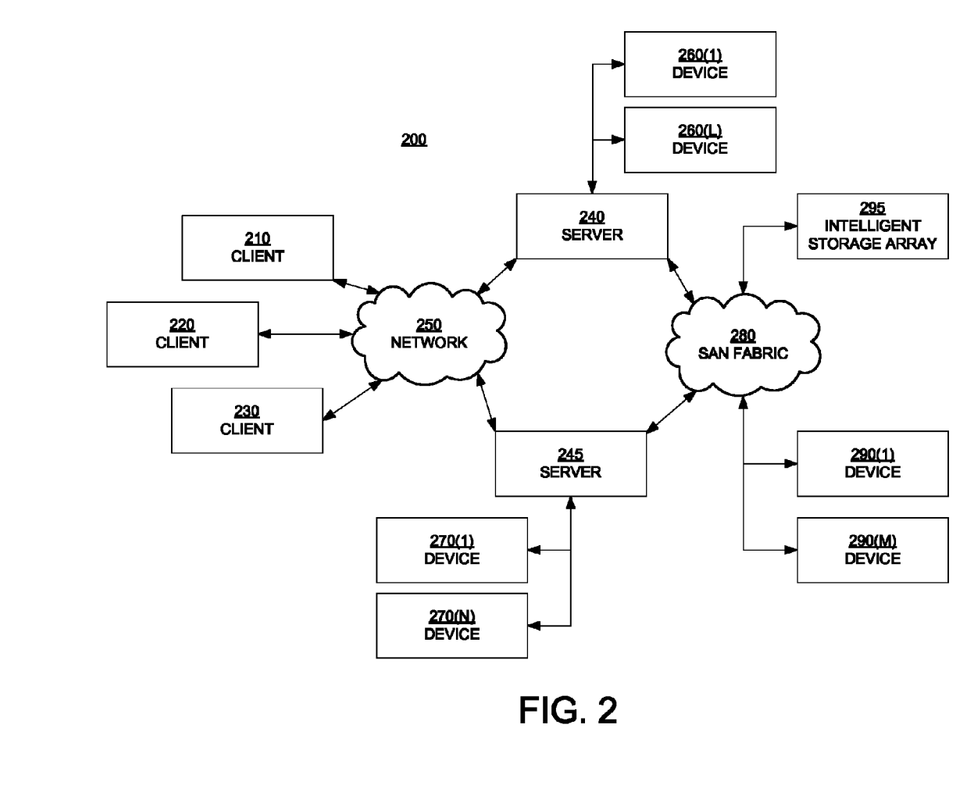
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a strong authentication solution for a variety of disparate third party identity managers that provide a gateway to an LDAP directory. In some other embodiments, the implementation of an LDAP proxy that remotely coordinates the performance of first and second factor authentication solutions eliminates the need for incorporating a second factor authentication solution internally within the systems of a third party authentication and authorization services. Furthermore, the implementation of an LDAP proxy that remotely coordinates the performance of first and second factor authentication solutions can be quickly deployed since it is able to communicate with various third party managers operating on disparate software platforms through the common LDAP standard.

Embodiments of the present disclosure are described within the context of a data or file storage system, such as, an LDAP directory. In some embodiments, the file storage system supports a large enterprise including individuals (e.g., company, corporation, etc.). As previously described, the storage system provides for storing and organizing computer information, files and their data, for example within the storage devices of FIG. 2. At a high level, the storage system organizes files into a database for storage, organization, manipulation and retrieval by one or more requesting computing systems. Providing secure access to the information stored in the LDAP directory is important for efficient implementation of management and security polices within a file system of data infrastructure.

Figure 3:
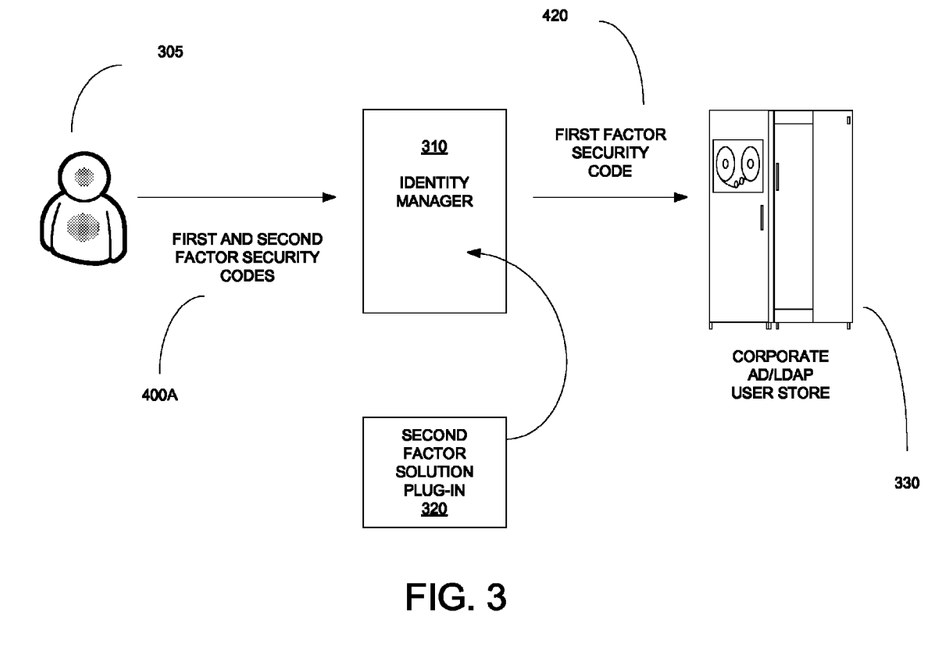
FIG. 3 is a flow diagram depicting a two factor authentication solution.

FIG. 3 is a flow diagram depicting a two factor authentication solution. As shown, a third party identity manager 310 provides authentication and authorization services that controls access to a corporate Active Directory or LDAP directory or user store 330. A user 305 wishing to access the LDAP directory must first authenticate itself using the third party identity manager 310. That is, the user 305 establishes communication with the third party identity manager 310, and upon authorization, the user 305 is therein provided access to the back-end LDAP directory 330, directly or through the gateway identity manager 310. In one case the user 305 delivers identifying information, such as, a username that identifies the user 305, and first and second factor security codes.

In particular, the identity manager 310 is configurable to implement a multi-factor authentication solution, such as, a two factor authentication solution. Many times, the third party identity manager is initially configured to implement a first factor solution using the LDAP authentication mechanism as provided by the LDAP server supporting the LDAP directory 330. That is, the LDAP server is able to authenticate using a first factor authentication mechanism, such as, verifying that a username and a reusable password 410 are associated and present on an access list.

However, the LDAP server is unable to authenticate using any other second factor authentication solution over the LDAP authentication channel established to perform the first factor authentication solution. As such, the identity manager 310 is configured to support the second factor authentication solution. Because each identity manager 310 is built on a different software platform, each additional authentication factor solution may be internally built within the software platform performing authentication and authorization. For instance, a proprietary second factor solution must be internally integrated within the software platform of the identity manager 310. This may be accomplished through a second factor solution plug-in 320 to integrate the second factor solution that is written on one platform or language with the existing and different software platform and language of the identity manager 310. In particular, an on-site software engineering team will incorporate the second factor solution plug-in 320 into the existing software platform of the identity manager 310. This entails learning the specific language and calls (e.g., application programming interface [API] calls) that are implemented by the platform of the identity manager 310 and interfacing these with the plug-in 320. Successful integration within the existing software platform may take three to five months to fully incorporate the second factor solution within the platform performing authentication and authorization services.

Figure 4A:
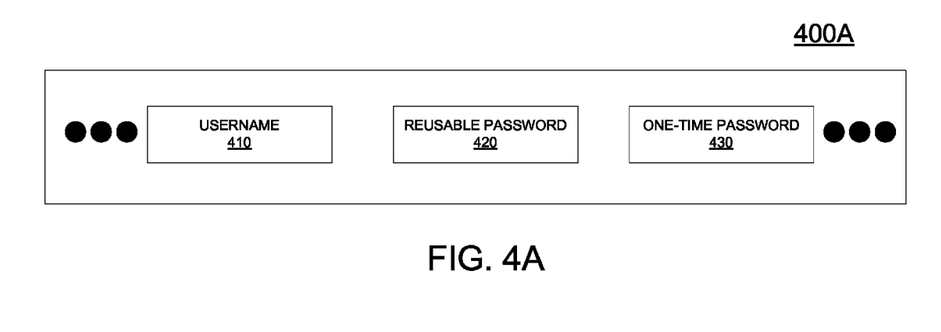
FIG. 4A is a diagram illustrating separate field entries for a reusable password and a one-time password in a two factor authentication solution.

FIG. 4A is a diagram illustrating separate field entries for a reusable password and a one-time password in a two factor authentication solution that is implemented by the identity manager 310 of FIG. 3. As shown, information for the two factor authentication solution is provided by user 305 in three different and separate fields of a message 400A: a username field 410, a reusable password field 420, and a one-time password field 430. As such, the user 305 enters a reusable password in field 420 for use in the first factor authentication solution. The identity manager 310 is able to pass the username and reusable password to the LDAP server for first factor authentication. Thereafter, the user is instructed to enter a one-time password in field 430 for use in the second factor authentication solution. In this case, the identity manager 310 through the second factor solution plug-in 320 is able to locally coordinate the authentication of the user 305.

As shown in FIG. 4A, the two factor solution as implemented by identity manager 310 receives information related to the first and second factor authentication solutions separately. In particular, the reusable password, as a first factor solution, is provided separately from the one-time password, as a second factor solution.

Figure 5:
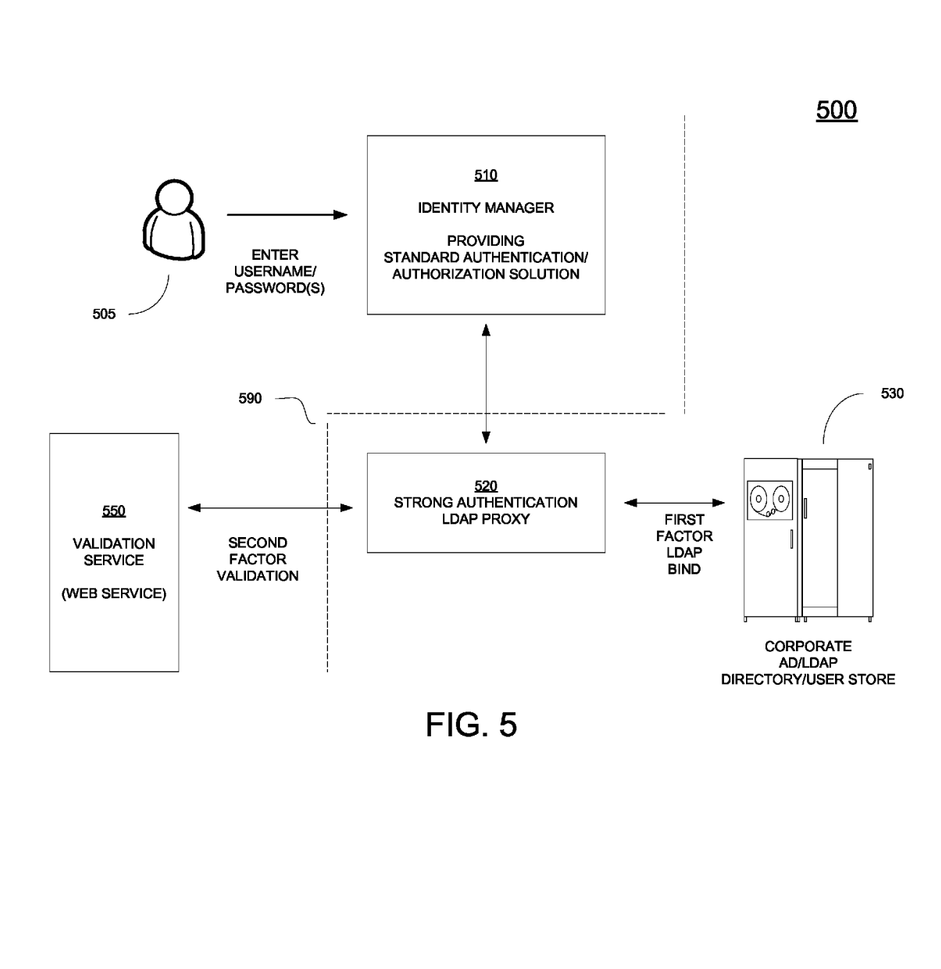
FIG. 5 is a data flow diagram illustrating a system 500 including a strong authentication LDAP proxy 520 that is capable of performing strong authentication in a two factor solution, in accordance with one embodiment of the present disclosure.

FIG. 5 is a data flow diagram illustrating a system 500 including a strong authentication LDAP proxy 520 that is capable of performing strong authentication in a two factor solution, in accordance with one embodiment of the present disclosure. The purpose of the strong authentication LDAP proxy 520 is to provide a thin LDAP service that looks for LDAP compatible BIND requests having both a first factor (e.g., username/password) and a second factor (e.g., one-time password or any other type of security code).

As shown in FIG. 5, a third party identity manager 510 provides authentication and authorization services in association with a corporate Active Directory or LDAP directory or user store 530. For instance, the third party identity manager 510 uses LDAP for authentication/authorization, and can be used to control access to protected resources like web applications, networks, or host applications. In embodiments, the multi-factor strong authentication methods are implemented through an LDAP proxy 520 located behind the identity manager 510, as will be further described below. As such, a user 505 wishing to access protected resources must first authenticate itself using the third party identity manager 510. That is, the user 505 establishes communication with the third party identity manager 510, and upon authorization by the strong authentication LDAP proxy 520 in association with the backend LDAP directory 530, the user 505 is therein provided access to protected resources. In one case the user 305 delivers identifying information, such as, a username that identifies the user 505, and first and second factor security codes.

As shown in FIG. 5, the identity manager 510 provides the interface with the user 505, and controls access to protected resources through the implementation of the strong authentication LDAP proxy 520. That is, line 590 provides a militarized zone indicating multi-factor authentication solutions provided by the identity manager 510 and the strong authentication LDAP proxy must be performed before the user 505 is able to access protected resources. In that manner, the strong authentication LDAP proxy 520 acts as a gateway to protected resources, through the implementation of multi-factor authentication solutions using LDAP.

Embodiments of the present invention are able to integrate with existing third party identity manager solutions through the use of an LDAP proxy without changing the user interface of the identity manager. This seamless integration is accomplished by incorporating a two factor authentication solution within a single password field both for purposes of receiving the information at the identity manager 510 from user 505, and for delivering the information from the identity manager 510 to the LDAP proxy over an LDAP channel. For instance, first and second factor security codes are combined into one password field as handled by the identity manager. In that manner, the software platform for the identity manager 510 need not be changed in most cases, and only slightly modified in other cases. That is, the software platform is already configured with recognizing a password field in a BIND request. Although that field is intended to support one password, embodiments of the present invention are able to take advantage of the field, and incorporate the delivery of two passwords or security codes in the password field. In most cases, the password field is configured to accept lengthy passwords (e.g., 32 bytes of information) though users typically only use a small portion of the maximum length given. In that manner, two passwords are easily fitted within the password field. In those cases where the password field is not large enough, it may be modified to accept lengthier passwords, such that first and second factor security codes may fit within its given length.

Figure 4B:
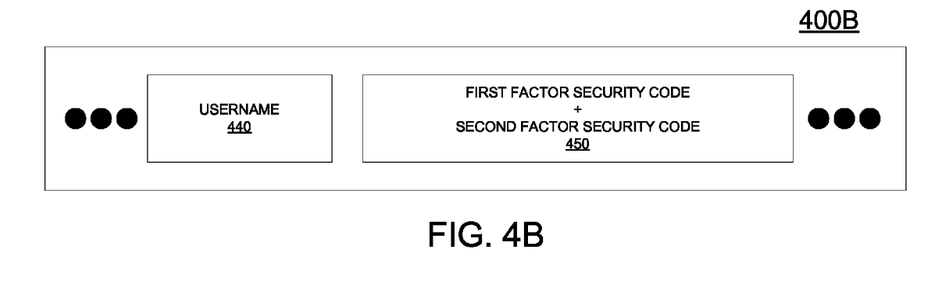
FIG. 4B is a diagram illustrating a combined field entry for a reusable password and a one-time password in a two factor authentication solution, in accordance with one embodiment of the present disclosure.

In particular, FIG. 4B is a diagram illustrating a combined field entry for a first factor security code (e.g., reusable password) and a second factor security code (e.g., one-time password) in a two factor authentication solution that is implemented by the identity manager 510 of FIG. 5. As shown, information for the two factor authentication solution is provided by user 505 in two fields of a message 400B: a username field 440, and a combined password field 450. The combined password field 450 includes the first factor security code and the second factor security code. As such, in one implementation, the user 505 enters both first and second factor security codes in field 450 for use in first and second factor authentication solutions.

As shown in FIG. 5, the identity manager 510 passes the first and second factor security codes to the strong authentication LDAP proxy 520 over an LDAP channel. That is, the identity manager need not be reconfigured since it already is able to communicate LDAP requests, calls, and operations using LDAP. In one embodiment, the LDAP proxy 520 is a BIND request sniffer, and is able to determine when a request to authenticate a user is made, and to pass on relevant information to each of the validating services. For instance, the strong authentication LDAP proxy 520 is able to separate out the first factor security code from field 450 and send the first factor to the LDAP directory 530 for performing LDAP authentication. In addition, the LDAP proxy 520 is able to separate the second factor security code from field 450 and send the second factor security code to validation service 550 (e.g., a web service) for performing a second factor authentication method. In that manner, the LDAP proxy 520 is able to act as a gateway for providing access to the LDAP directory 530 to the user and/or a client representing the user or providing access to the LDAP directory for the user. In particular, the LDAP proxy 520 only opens access to the LDAP directory 530 when both the first factor and the second factor have been authenticated and verified.

Figure 6:
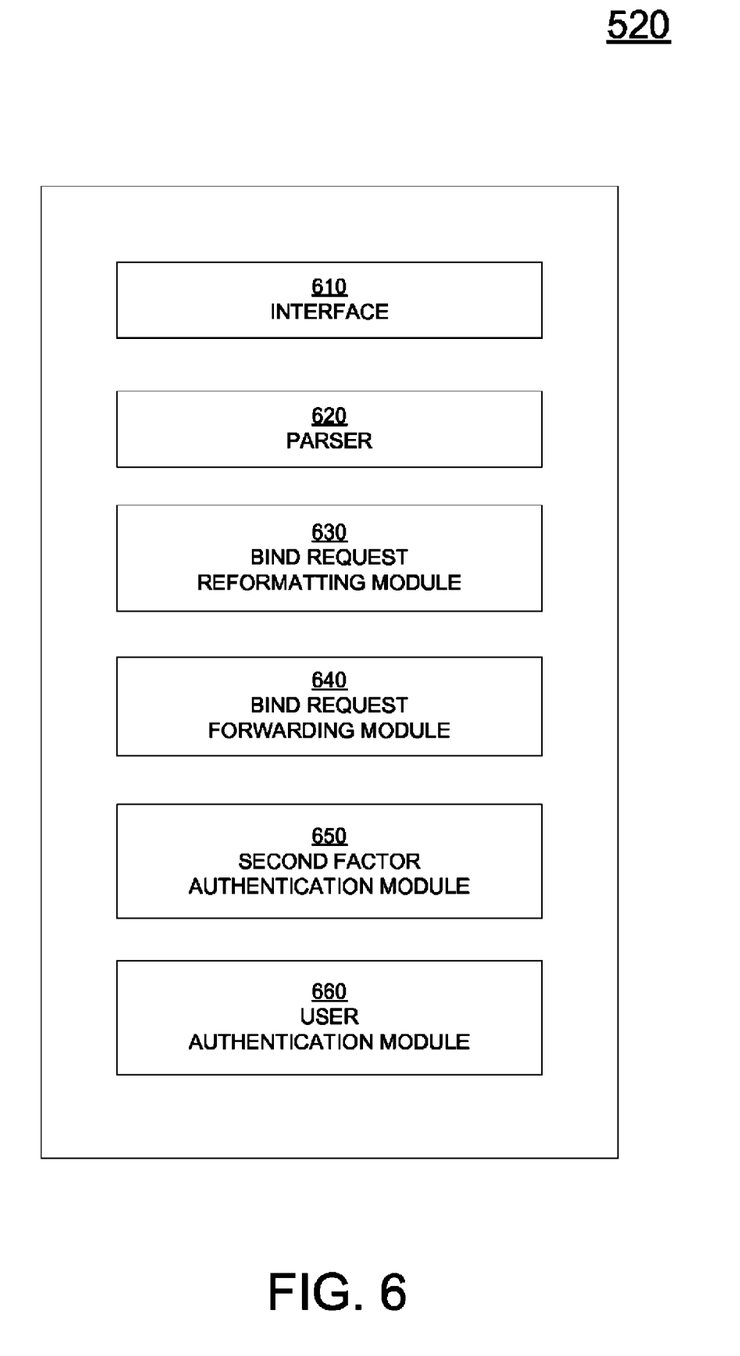
FIG. 6 is a block diagram illustrating an LDAP proxy system capable of performing strong authentication in a two factor solution, in accordance with one embodiment of the present disclosure.

FIG. 6 is a block diagram illustrating an LDAP proxy 520 capable of performing strong authentication in a two factor solution, in accordance with one embodiment of the present disclosure. The LDAP proxy 520 may be implemented within the system 500 shown in FIG. 5 providing access for a user 505 to an LDAP directory 530.

As shown, the LDAP proxy 520 includes an interface 610 for communicating with a client device (such as, a third party authentication and authorization service, or user device, etc.), and for communicating with an LDAP server that supports an LDAP directory. For instance, interface 410 is configured to receive an LDAP compatible BIND request, from the client device, such as, an identity manager. The BIND request is used for authenticating a user to the LDAP server. In addition, the BIND request includes a password that comprises both a first factor security code and a second factor security code.

The LDAP proxy 520 also includes a parser 620 that is able to identify the BIND request from all the requests (e.g., LDAP requests, calls, and operations) from the identity manager. These requests may originate from a device associated with a user making the BIND request for access to the LDAP directly. In particular, parser 620 is able to strip the second factor security code from the password. That is, parser 620 is able to identify both the first factor security code and the second factor security code for purposes of performing strong authentication.

In addition, the LDAP proxy 520 includes a BIND request reformatting module 630. Specifically, the BIND request originally received and intended for the LDAP server is reformatted and/or reconfigured to include the stripped password, such that the second factor security code is not included in the reformatted BIND request. In that manner, the forwarding module 640 is able to forward the reformatted BIND request to the LDAP proxy for authentication purposes.

The LDAP proxy 520 includes a second factor authentication module 650. In one implementation, module 650 performs the second factor authentication locally and internally in the proxy 520. In other implementations, module 650 delivers the second factor security code along with other identifying and relevant information (e.g., username) to a local enterprise validation service, such as, over a local area network (LAN) connection to the validation service, that performs the second factor authentication. For instance, the enterprise validation service may be a remote authentication dial in user service (RADIUS) that provides authentication and authorization management for controlling access to a network. In still another implementation, module 650 delivers the second factor security code along with other identifying and relevant information to another third party validation service over a communication network.

Also, the LDAP proxy 520 includes a user/client authentication module 660 for authenticating the client to the LDAP server supporting the LDAP directory. In particular, module 660 authenticates the client and username of the client when both the first factor security code and the second factor security code are authenticated using their respective authentication and validation methods and services.

Figure 7:
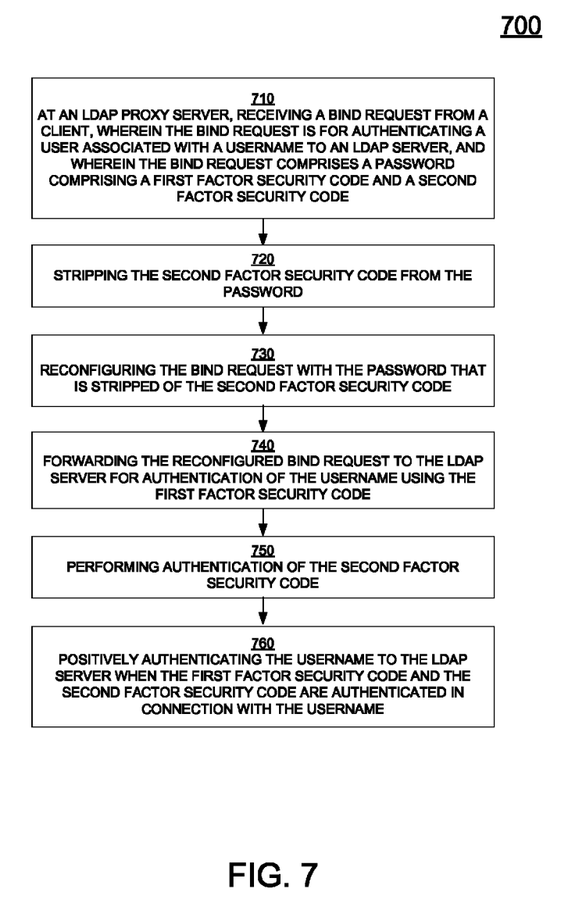
FIG. 7 is a flow chart of a computer-implemented process for performing strong authentication in a two factor solution using an LDAP proxy, in accordance with one embodiment of the present disclosure.

FIG. 7 is a flow chart 700 of a computer-implemented process for performing strong authentication in a two factor solution using an LDAP proxy, in accordance with one embodiment of the present disclosure. For instance, in one embodiment, the process outlined in flowchart 700 is implemented by LDAP proxy 520 of FIGS. 5 and 6, acting as a front-end to a corporate LDAP directory, in order to perform and/or control a two factor strong authentication solution for authenticating a user to an LDAP directory.

In block 710, an LDAP compatible BIND request is received from a client. In one implementation, the BIND request is received from a third party authorization service providing access to the LDAP directory. The BIND request is delivered, communicated, and/or formatted using LDAP, and is intended for purposes of performing authentication by the LDAP server supporting the LDAP directory. Specifically, the BIND request is used for authenticating a user associated with a "username" to an LDAP server. Of particular import, the BIND request includes a password that is a combination of a first factor security code and a second factor security code. That is, in the message containing the BIND request, in the field or space designated for a password, the information contained therein includes both the first and second factor security codes. As such, in embodiments of the present invention, the LDAP proxy server is easily integrated with existing third party authentication software platforms, since second factor security code information is transferred using the standard BIND request that is compatible with LDAP and understood by the third party authentication and authorization system, such as, an identity manager.

In one embodiment, for purposes of integration, the third party identity manager is reconfigured to communicate with the LDAP proxy. In one implementation, the third party identity manager is reconfigured to point or redirected to the LDAP proxy instead of the LDAP server. As such, the LDAP proxy acts as a gateway between the client (e.g., identity manager and the user behind the identity manager) and the LDAP server supporting the LDAP directory. In that manner, all LDAP calls, requests, and/or operations from the client are directed to the LDAP proxy and not the LDAP server. Further, the LDAP proxy knows the end-point addresses (e.g., internet protocol [IP] addresses) of the LDAP server and any other validation service used for performing the second factor authentication.

At block 720, the LDAP proxy is configured as a BIND request sniffer. That is, the BIND request used to authenticate a user, as forwarded from the client, is identifiable by the LDAP proxy from all other LDAP calls, requests, and/or operations. Typically, these calls, request, and/or operations are made over an LDAP channel specifically used for LDAP communication between two devices.

More particularly, the LDAP proxy is configured to strip the second factor security code from the password or information contained in the password field of the BIND request. In one embodiment, the second factor security code is a one-time password that is stripped. Specifically, the one-time password provides a password that is valid for only one transaction or communication session. Coordination between the user and the authentication service implementing the one-time password is necessary so that both have or can obtain the same one-time password for verification purposes. In other embodiments, the second factor security code may support any other authentication method or system, to include as examples, various formats (e.g., time or hashed based) of one-time passwords, digital certificates, digital keys, biometric information, etc.

At block 730, the originally received BIND request is now reconfigured and/or reformatted with the password that is stripped of the second factor security code. As such, the reconfigured BIND request does not include the second factor security code (e.g., the one-time password). In that manner, the reconfigured BIND request includes a security code that is now understood by the LDAP server when performing its authentication and validation services used for validating the user behind the client. For instance, the reconfigured BIND request includes information related to performing the first factor authentication, such as, a username and a reusable password.

At block 740, the reconfigured BIND request is forwarded to the LDAP server for authentication of the username using the first factor security code using the standard LDAP authentication service. That is, the LDAP proxy makes a BIND request, using the reconfigured BIND request, to the corporate LDAP directory on behalf of the client. As such, the first factor security code is validated using the enterprise LDAP directory service. Using the example of a username and password as a first factor security code, the LDAP server knows permissible username/reusable password associations and is able to perform an authentication process based on the provided first factor information to authenticate the username and corresponding user for LDAP directory access. In that manner, the original BIND request intended for authentication by the LDAP server has been intercepted by the LDAP proxy, reconfigured to include the proper security code information, and once reconfigured, forwarded to the LDAP proxy for authentication purposes.

At block 750, second factor authentication is performed using the second factor security code. In one implementation, the second factor authentication process is performed internally, or by a third party service. For instance, second factor authentication may be performed by a validation server, wherein the LDAP proxy makes or delivers an authentication request to the validation server over a channel using the stripped second factor security code (e.g., one-time password). In one implementation, the LDAP proxy delivers the second factor security code along with other identifying and relevant information (e.g., username) to a local enterprise validation service, such as, over a local area network (LAN) connection to the RADIUS validation service, that performs the second factor authentication. In still another implementation, LDAP proxy delivers the second factor security code along with other identifying and relevant information to another third party validation service over a communication network (e.g., internet). In that manner, the second factor authentication is performed by a web service over a cloud network.

In one embodiment, the first factor authentication process and the second factor authentication process are performed serially. In another embodiment, the first factor authentication process and the second factor authentication processes are performed in parallel.

At block 760, results from both authentication processes are analyzed to determine if the username corresponding to a user is authenticated for access to the LDAP directory. In particular, the username is negatively authenticated when either of the first factor security code or the second factor security code is not authenticated in connection with the username. As such, the username and corresponding user are denied access to the LDAP server.

On the other hand, the username is positively authenticated to the LDAP server when the first factor security code and the second factor security code are both authenticated in connection with the username. For instance, when both validation or authentication of the first factor security code (e.g., username and reusable password) is received from the LDAP server, and validation or authentication of the second factor security code (e.g., one-time password) is received from the validation server, then the username corresponding to a user is given authorization to access the LDAP server.

In another embodiment, the proxy server acts as a pass-through gateway for all non-BIND requests. Specifically, LDAP compatible calls, requests, and/or operations that are not BIND requests are recognized by the LDAP proxy as coming from the now authenticated user corresponding to the username, and the LDAP proxy forwards these messages to the LDAP server for execution. In addition, all responses coming from the LDAP server and associated with those LDAP calls, requests, and/or operations that are not BIND requests are returned to the client (e.g., identity manager), or delivered directly to the device associated with the user.

Figure 8:
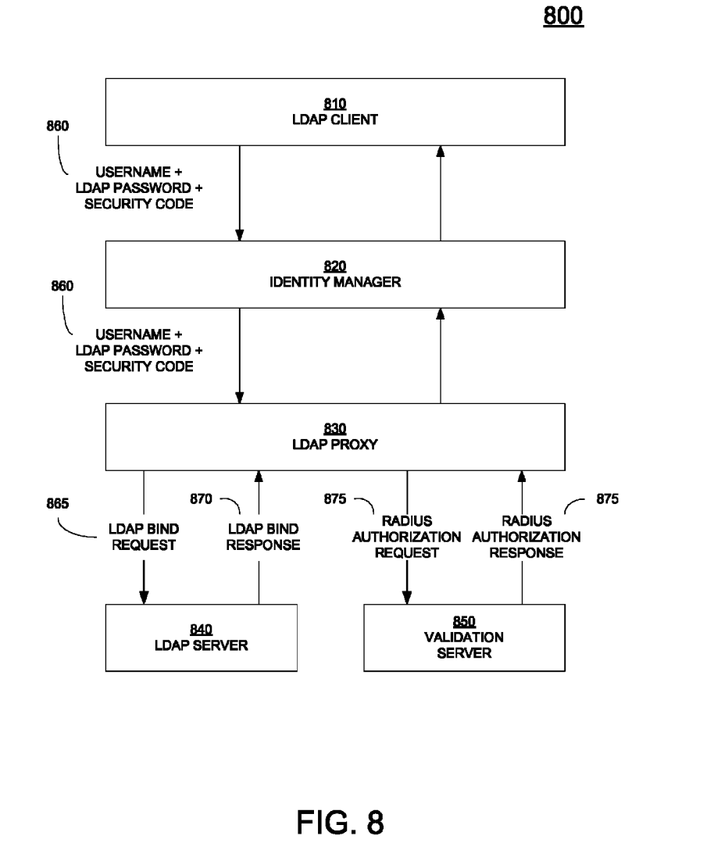
FIG. 8 is a block diagram illustrating an architecture of a strong authentication LDAP proxy capable of implementing a two factor strong authentication solution, in accordance with one embodiment of the present disclosure.

FIG. 8 is a block diagram illustrating an exemplary architecture of a strong authentication LDAP proxy 800 capable of implementing a two factor strong authentication solution, in accordance with one embodiment of the present disclosure. For instance, in one embodiment, the LDAP proxy 800 of FIG. 8 can be implemented by the process outlined in flow chart 700 in order to perform and/or control a two factor strong authentication solution for authenticating a user to an LDAP directory. In addition, the LDAP proxy 800 is capable of performing the operations associated with the LDAP proxy 520 and 600 of FIGS. 5 and 6, respectively.

As shown in FIG. 8, the LDAP client 810 represents a user that is trying to access a LDAP directory. Authentication of the LDAP client 810 is necessary and is performed through an identity manager 820 that provides an authentication and/or authorization solution. In particular, the LDAP client 810 sends username, LDAP password, and a second factor security code in a message 860 to the identity manager. The LDAP password and the second factor security code in message 860 is provided in one field for inclusion in a BIND request, as previously described. As such, the identity manager 820 is configured to generate and send a BIND request to the LDAP proxy 830, instead of the LDAP server 840. This is because the password information provided in the BIND request is packaged to include both the LDAP password, as a first factor security code, and the second factor security code (e.g., one-time password). In one embodiment, the LDAP proxy 830 is configured using the open source LDAP (OpenLDAP) protocol and/or stand-alone LDAP daemon (SLAPD) for server configuration, as an implementation of LDAP.

The LDAP proxy 830 sniffs all LDAP package data units (PDUs) and recognizes the BIND request. The LDAP proxy 830 is able to split the LDAP security code and the second factor security code. The BIND request 865, now stripped of the second factor security code, is delivered to the corporate LDAP directory or active directory service, as supported by the LDAP server 840, on behalf of the identity manager. An LDAP BIND response 870 is returned from the LDAP server 840 to the LDAP proxy 830.

Upon successful first factor validation by the LDAP server 840, the LDAP proxy 830 makes a RADUS authentication request 875 to a validation server 850. The request 875 includes the second factor security code that was stripped from the original BIND request. A RADIUS authorization response 875, positive or negative, is returned to the LDAP proxy 830. Upon successful second factor validation in the RADIUS response 875, the username corresponding to the user is validated for access to the LDAP directory.

As such, with successful first and second factor validations, the LDAP proxy 830 responds with a positive authorization message to the identity manager 820. Thereafter, the LDAP proxy 830 forwards all other LDAP request types (e.g., calls, requests, operations, etc.) to the corporate LDAP server. In addition, the LDAP proxy 830 forwards all non-BIND responses, sent from the LDAP server 840, to the identity manager 820.

Thus, according to embodiments of the present disclosure, two factor authentication systems and methods are described as implemented through an LDAP proxy server, wherein the LDAP proxy splits or separates a second factor security code form the password of a BIND request, and authenticates the first factor security code against the standard LDAP service, and validates the second factor security code using a validation service (e.g., RADIUS/web service, etc.).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having computer-executable instructions for causing a computer system to perform operations comprising:
   at a lightweight directory access protocol (LDAP) proxy server at the computer system, receiving a BIND request from a client, wherein said BIND request is for authenticating a user associated with a username to an LDAP server, and wherein said BIND request comprises a password comprising a first factor security code and a second factor security code;
   stripping said second factor security code from said password;
   reconfiguring said BIND request with said password that is stripped of said second factor security code;
   forwarding said reconfigured BIND request to said LDAP server for authentication of said username using said first factor security code;
   performing authentication of said second factor security code; and
   positively authenticating said username to said LDAP server when said first factor security code and said second factor security code are authenticated in connection with said username.

2. The computer-readable storage medium of claim 1, wherein the instructions for stripping said second factor security code comprises:
   stripping a one-time password as said second factor security code from said password.

3. The computer-readable storage medium of claim 1, said second factor security code is at least one of:
   a one-time password;
   a certificate; or
   a biometric.

4. The computer-readable storage medium of claim 1, wherein the instructions for performing authentication further comprises:
   delivering said second factor security code to a validation service for authentication of said second factor with said username.

5. The computer-readable storage medium of claim 1, wherein the instructions for authenticating said username further comprises:
   receiving validation of said first factor security code from said LDAP server; and
   receiving validation of said second factor security code from said validation service.

6. The computer-readable storage medium of claim 1, wherein the instructions for the operations further comprise:
   negatively authenticating said username to said LDAP server when either of said first factor security code or said second factor security code is not authenticated in connection with said username.

7. The computer-readable storage medium of claim 1, wherein the instructions for the operations further comprise:
   receiving a non-BIND LDAP call associated with said username; and
   forwarding said non-BIND LDAP call to said LDAP server.

8. The computer-readable storage medium of claim 1, wherein the instructions for the operations further comprise:
   reconfiguring said client to direct LDAP requests and operations to said LDAP proxy server instead of said LDAP server.

9. A computer system comprising:
   a processor; and
   memory coupled to said processor and having stored therein instructions that, if executed by said computer system, cause said computer system to execute operations comprising:
     receiving a BIND request from an identity manager, wherein said BIND request is for authenticating a user associated with a username to lightweight directory access protocol (LDAP) server, and wherein said BIND request comprises a password comprising a first factor security code and a second factor security code;
     stripping said second factor security code from said password;
     reconfiguring said BIND request with said password that is stripped of said second factor security code;
     forwarding said reconfigured BIND request to said LDAP server for authentication of said username using said first factor security code;
     performing authentication of said second factor security code; and
     positively authenticating said username to said LDAP server when said first factor security code and said second factor security code are authenticated with said username.

10. The computer system of claim 9, wherein said stripping said second factor security code comprises:
   stripping a one-time password as said second factor security code from said password.

11. The computer system of claim 9, wherein said performing authentication further comprises:
   delivering said second factor security code to a validation service for authentication of said second factor with said username.

12. The computer system of claim 11, wherein said authenticating said username further comprises:
   receiving validation of said first factor security code from said LDAP server; and
   receiving validation of said second factor security code from said validation service.

13. The computer system of claim 9, wherein said method the operations further comprise:
   negatively authenticating said username to said LDAP server when either of said first factor security code or said second factor security code is not authenticated with said username.

14. The computer system of claim 9, wherein the operations further comprise:
   receiving a response from said LDAP server that is in response to an LDAP call associated with said username;
   forwarding said response to a client device associated with said username.

15. The computer system of claim 9, wherein the operations further comprise:
   reconfiguring said identity manager to direct all LDAP requests and calls to said LDAP proxy server instead of said LDAP server.

16. A computer-implemented method comprising:
   at a lightweight directory access protocol (LDAP) proxy server, receiving a BIND request from a client, wherein said BIND request is for authenticating a user associated with a username to an LDAP server, and wherein said BIND request comprises a password comprising a first factor security code and a second factor security code;
   stripping said second factor security code from said password;
   reconfiguring said BIND request with said password that is stripped of said second factor security code;
   forwarding said reconfigured BIND request to said LDAP server for authentication of said username using said first factor security code;
   performing authentication of said second factor security code; and
   positively authenticating said username to said LDAP server when said first factor security code and said second factor security code are authenticated in connection with said username.

17. The computer implemented method of claim 1, wherein said stripping said second factor security code comprises:
   stripping a one-time password as said second factor security code from said password.

18. The computer implemented method of claim 16, further comprising:
   delivering said second factor security code to a validation service for authentication of said second factor with said username.

19. The computer implemented method of claim 18, wherein said positively authenticating said username further comprises:
   receiving validation of said first factor security code from said LDAP server; and
   receiving validation of said second factor security code from said validation service.

20. The computer implemented method of claim 16, further comprising:
   negatively authenticating said username to said LDAP server when either of said first factor security code or said second factor security code is not authenticated in connection with said username.

* * * * *